July 9, 1946. M. R. SPRINKLE ET AL 2,403,563
SURGE TANK SYSTEM
Filed Oct. 4, 1943
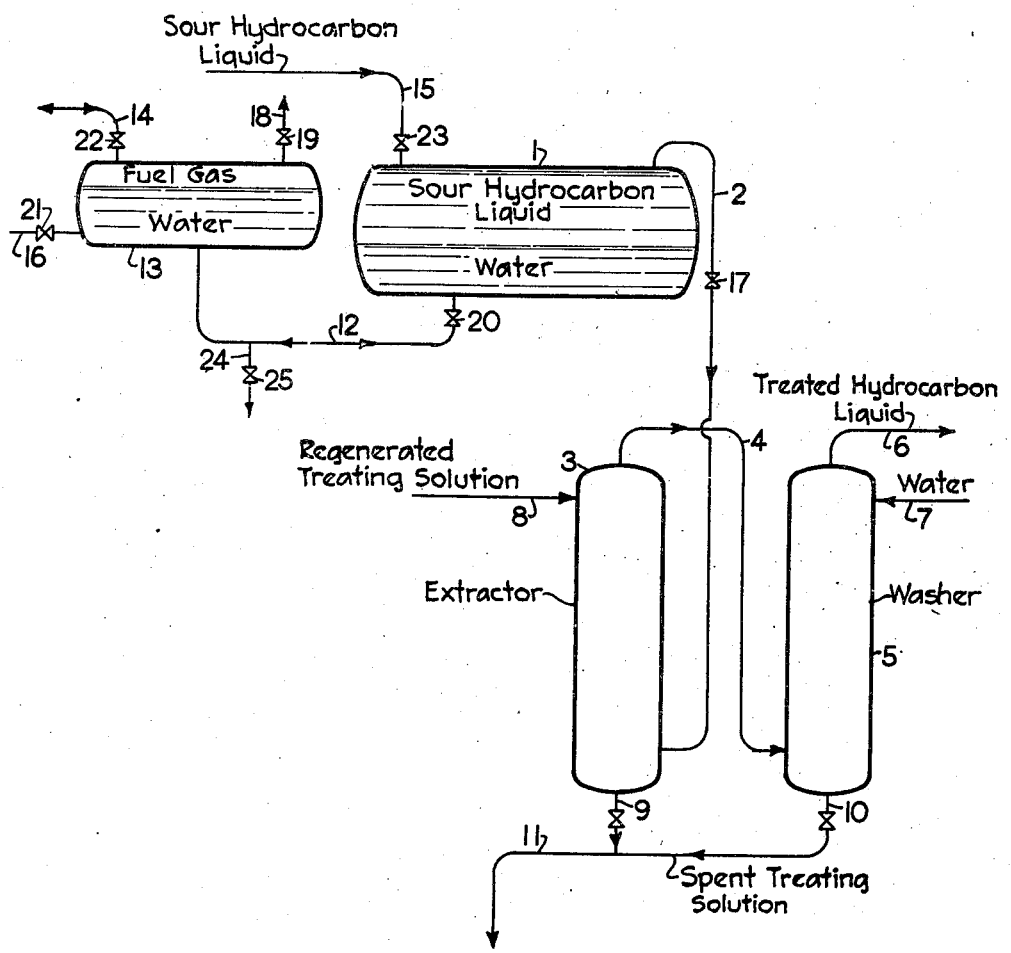
Inventors: Marshall R. Sprinkle
Robert S. MacDuff
By their Attorney:

Patented July 9, 1946

2,403,563

UNITED STATES PATENT OFFICE 2,403,563

SURGE TANK SYSTEM

Marshall R. Sprinkle, Edwardsville, and Robert S. MacDuff, Alton, Ill., assignors to Shell Development Company, San Francisco, Calif., a corporation of Delaware Application October 4, 1943, Serial No. 504,984

7 Claims. (Cl. 137—78)

The present invention relates to surge tank systems and more particularly to surge tank systems for use in processes wherein absorption of small quantities of air or oxygen by the reactants in passing through a surge tank system is deleterious or undesirable.

In the majority of industrial chemical processes involving process flows it has been found advantageous to include surge tanks within the flow system. These tanks serve to minimize or eliminate fluctuations in flow rates throughout the system and conventionally comprise a simple reservoir from which fluid material to be treated or reacted may be withdrawn at a constant rate regardless of variations of input flow to the reservoir. However, since the liquid level within the surge tank is either continuously or periodically changing, it is necessary to provide a vent or breather arrangement in order to avoid substantial pressure changes within the system. In some instances, particularly where the material passing through the surge tank tends to absorb air, difficulties in the operation of the process are encountered as a result of the air absorbed in the surge tank, usually in the form of undesirable side reactions, excessive foaming, sludging, or the like.

It is an object of the present invention to provide a surge tank system wherein contamination, by air absorption, of materials passing therethrough is substantially eliminated. Other objects, together with some of the advantages to be derived from operating according to the present invention, will become apparent from the following detailed description thereof, taken together with the accompanying drawing which is a schematic flow diagram of a specific application of one embodiment of the invention.

In the present improved surge tank system, fluctuation in the content of the surge tank due to inconstant rate of liquid input thereto is compensated by interflow of an aqueous displacement medium, preferably water, between the surge tank and an auxiliary tank in accordance with flow rate variations to the surge tank, and air is excluded from the surge tank by maintaining a vapor blanket over the liquid level in the auxiliary tank, as will be explained in detail below.

For purposes of illustration, the invention will be described in relation to its application to a specific process wherein a surge tank is normally included and wherein air absorption by materials passing through the surge tank is objectionable.

The solutizer process, by means of which mercaptans and other weak organic acids contained in sour hydrocarbon distillates, and more particularly in gasoline distillates, are extracted with solutizer solution, i. e. aqueous solutions of alkali metal hydroxides containing solutizers, is well known. The solutizer process has been described and the several compounds particularly suitable as solutizers have been enumerated in the general literature, for example, Refiner and Natural Gasoline Manufacturer, May 1939, pages 171 to 176 and March 1940, pages 73 to 76; Industrial and Engineering Chemistry, vol. 32, pages 257 to 262, February 1940; Chemical and Metallurgical Engineering, vol. 47, pages 776 to 778, November 1940, etc. As shown in these references, the solutizer process involves the extraction of mercaptans whereby a spent solutizer solution is produced which is continuously regenerated as by steam stripping, and the regenerated solution is then re-used for further extraction of mercaptans. The principal purpose of the process is to sweeten sour gasoline distillates.

It has been observed that in the course of such treatment, hydrocarbon distillates, e. g. gasoline, may deteriorate in color and the solutizer solutions, i. e. alkali metal hydroxide solutions containing solutizers, at times tend to form relatively stable emulsions with the hydrocarbon oil under treatment, probably due to gradual accumulation of emulsifiers believed to be resinous substances not removable by steam stripping, which emulsions either reduce the throughput due to retarded settling or cause carry-over of valuable solutizer.

It has been found, however, that the troublesome substances, emulsifiers as well as the color bodies, are formed through oxidation, probably of some components contained in the hydrocarbon oil to be treated. One of the principal places wherein undesirable oxidation and/or oxygen absorption normally occurs is in the surge tank system of the process as usually operated.

According to the present invention such undesirable oxidation may be avoided, for example in the manner disclosed in the accompanying drawing. Sour hydrocarbon liquid free from absorbed air or oxygen is passed from conduit 15 into surge tank 1 from whence it passes through conduit 2 into extractor 3 wherein it is countercurrently contacted with fresh solutizer solution entering through conduit 8. Spent solutizer solution passes out of extractor 3 through conduit 9 and thence through conduit 11 to be regenerated. Treated hydrocarbon liquid and small amounts of entrained solutizer solution pass out of extractor 3 through conduit 4 to washer 5 wherein they are countercurrently contacted with water entering washer 5 through conduit 7. The wash water, including spent solutizer solution removed from the hydrocarbon stream, passes out of washer 5 through conduit 10 to contact 11, the treated and washed hydrocarbon liquid passing through conduit 6 to utilization, storage or further treatment.

A water level is maintained in surge tank 1 and in tank 13, conduit 12 permitting passage of water in both directions. A blanket of fuel gas is maintained above the water level in tank 13. In normal operation, sour hydrocarbon liquid is withdrawn from surge tank 1 through conduit 2, the rate of flow being controlled by valve 17 or other suitable means. If the rate of flow of sour hydrocarbon liquid to surge tank 1 through conduit 15 should temporarily exceed the rate of withdrawal from surge tank 1, water is displaced from surge tank 1 and forced through conduit 12 to tank 13, in turn forcing fuel gas from the top of tank 13 to a gas reservoir (not shown), such as a conventional water-sealed gasholder, for example, which delivers gas under a slight positive pressure. Conversely, when the rate of withdrawal from surge tank 1 is less than the rate of input, the water level in surge tank 1 will rise, water flowing by gravity from tank 13 through conduit 12, and an equivalent quantity of fuel gas will pass through conduit 14 to replace the water exiting from tank 13.

A purging conduit 18 including valve 19 is also provided in tank 13 in order to avoid entrapment of an air pocket when starting operations. Thus, in putting the unit in operation, the system may be first charged with fuel gas admitted through conduit 14, valves 16, 19, 23 and 25 being closed during this purging operation. Valves 20 and 21 are then opened and a quantity of water admitted to tank 13 through conduit 16, and to surge tank 1 through conduit 12, valve 19 being opened meanwhile for a sufficient period of time to insure escape of any air entrapped in tank 13. When a suitable liquid level has been attained in surge tank 1, valve 23 is opened and flow of sour hydrocarbon liquid to surge tank 1 permitted, resulting in a back pressure within surge tank 1 and preventing further flow of water thereto from tank 13 and permitting the desired liquid level to be attained in tank 13, whereupon valve 21 is closed. The system will then operate automatically to take care of fluctuation in feed rate to surge tank 1, as described above. Water may be withdrawn from the surge tank system, when desired, through conduit 24 by opening valve 25.

Although water alone is generally to be preferred as the aqueous displacement medium, other primarily aqueous media may be employed if desired or useful for a particular purpose, as for example it may be advantageous to include varying amounts of salts, acids, alkalis, wetting agents or alcohols and the like in the displacement medium for various purposes.

It has been found that the maintenance of an inert blanket over the water in tank 13 is an essential feature of the invention since, in the absence of such a blanket, sufficient air is absorbed by the water in tank 13 and transmitted to surge tank 1, wherein it is taken up by the hydrocarbon material, to seriously interfere with the operation of the sweetening process. Although fuel gas is a particularly suitable material for the purpose of forming an inert blanket over the water in tank 1, it will be appreciated that any other material which is normally in a vapor state at the temperature of operation, is relatively insoluble in water, and does not contain air or oxygen, may be utilized. Suitable examples of such materials include, for example, nitrogen, methane, ethane, butane, propane and the like.

Although the present improved surge tank system has been described with particular reference to its use in combination with the solutizer gasoline sweetening process, it will be readily understood that the principles of operation and construction have wide applicability in any surge tank arrangement wherein it is necessary or desirable to exclude oxygen from a system wherein a water-immiscible liquid is passed through a surge tank.

For example, the problem of oxygen exclusion also arises in the separation of butadiene, pentadiene, hexadiene, etc., from other $C_4$, $C_5$ and $C_6$ hydrocarbons respectively, oxygen causing the formation of gummy materials as well as foaming and emulsifying agents; or in the separation of benzene, toluene, xylenes, etc. from narrow boiling hydrocarbon mixtures containing them by extractive distillation with phenol, oxygen in this case causing corrosion in the reboiler of the extractor, or sludging of the phenol, or both; or in the polymerization of olefins with phosphoric acid or other solid catalyst, oxygen causing gumming of the catalyst, thereby shortening its useful life, etc. In virtually all commercial plants wherein processes such as those above described are carried out it is both necessary and desirable to include one or more surge tank systems, and it is in such systems that contamination of the product or reactants with oxygen often occur. Such contamination may be entirely obviated by use of the surge tank system described in the present specification.

We claim as our invention:

1. In an arrangement for minimizing flow fluctuations in a flow system the combination comprising a closed surge tank, a closed auxiliary tank, flow communication means between said surge tank and said auxiliary tank, an aqueous displacement medium comprising water in said surge tank and said auxiliary tank, said flow communication means terminating beneath the liquid level of said aqueous displacement medium in said surge tank and said auxiliary tank, means for introducing a substantially water-immiscible oxidizable fluid material having a density less than that of water to said surge tank, means for withdrawing said substantially water-immiscible oxidizable fluid material from said surge tank and means for maintaining an oxygen excluding vapor blanket above the liquid level of said aqueous displacement medium in said auxiliary tank.

2. In an arrangement for minimizing flow fluctuations in a flow system the combination comprising a closed surge tank, a closed auxiliary tank, flow communication means between said surge tank and said auxiliary tank, an aqueous displacement medium in said surge tank and said auxiliary tank, said flow communication means terminating at each end beneath the liquid level of said aqueous displacement medium in said surge tank and the liquid level of said aqueous displacement medium in said auxiliary tank, respectively, said aqueous displacement medium normally tending to find a common level by gravity flow through said flow communication means, means for introducing a substantially water-immiscible oxidizable fluid material having a density less than that of water to said surge tank, means for withdrawing said substantially water-immiscible oxidizable fluid material from said surge tank and means for maintaining an oxygen excluding vapor blanket above said liquid level of aqueous displacement medium in said auxiliary tank.

3. In an arrangement for minimizing flow fluctuations in a flow system, the combination comprising a closed surge tank, a closed auxiliary tank, flow communication means between said surge tank and said auxiliary tank, water bodies in said surge tank and said auxiliary tank, said flow communication means terminating at one end beneath the water level of said water body in said surge tanke and at the other end beneath the water level of said body of water in said auxiliary tank, said water bodies normally tending to find a common level by gravity flow through said flow communication means, means for continuously introducing to said surge tank liquid hydrocarbon material having a density less than that of water, said hydrocarbon material being of such nature as to necessitate exclusion of contact thereof with oxygen, means for continuously withdrawing said liquid hydrocarbon material from said surge tank at controlled flow rates and means for maintaining an oxygen-excluding vapor blanket above said water level in said auxiliary tank.

4. In an arrangement for minimizing flow fluctuations in a flow system, the combination comprising a closed surge tank, a closed auxiliary tank, flow communication means between said surge tank and said auxiliary tank, water bodies in said surge tank and said auxiliary tank, said flow communication means terminating at one end beneath the water level of said water body in said surge tank and at the other end beneath the water level of said body of water in said auxiliary tank, said water bodies normally tending to find a common level by gravity flow through said flow communication means, means for continuously introducing to said surge tank liquid hydrocarbon material having a density less than that of water, said hydrocarbon material being of such nature as to necessitate exclusion of contact thereof with oxygen, means for continuously withdrawing said liquid hydrocarbon material from said surge tank, and means for maintaining an oxygen-excluding vapor blanket under pressure above said water level in said auxiliary tank.

5. The system according to claim 3 wherein the oxygen excluding vapor blanket comprises a normally gaseous hydrocarbon.

6. The system according to claim 3 wherein the oxygen excluding vapor blanket comprises nitrogen.

7. The system according to claim 3 wherein the oxygen excluding vapor blanket comprises fuel gas.

MARSHALL R. SPRINKLE.
ROBERT S. MacDUFF.